United States Patent [19]

Godard

[11] 4,210,854
[45] Jul. 1, 1980

[54] METHOD AND DEVICE FOR CHARGING SECONDARY ELECTRIC BATTERIES BY PRIMARY SOURCES

[75] Inventor: Pierre Godard, Tremblay les Gonesse, France

[73] Assignee: Saft-Societe des Accumulateurs Fixes et de Traction, Romainville, France

[21] Appl. No.: 888,852

[22] Filed: Mar. 22, 1978

[30] Foreign Application Priority Data

Mar. 31, 1977 [FR] France ............................... 77 09831

[51] Int. Cl.² ............................................... H02J 7/04
[52] U.S. Cl. ....................................... 320/10; 320/23; 320/37; 320/44
[58] Field of Search .......................... 320/2-5, 320/10, 22-24, 15, 16, 37, 38, 39, 40, 43, 44

[56] References Cited

U.S. PATENT DOCUMENTS

| | | |
|---|---|---|
| 2,166,788 | 7/1939 | Amsden ................................. 320/10 |
| 3,409,815 | 11/1968 | Wright et al. |
| 3,735,234 | 5/1973 | Godard ................................. 320/44 |
| 3,947,743 | 3/1976 | Mabuchi ........................... 320/38 X |
| 3,987,352 | 10/1976 | Hirota . |

FOREIGN PATENT DOCUMENTS 1473210  2/1967  France .
1529792  5/1968  France .

*Primary Examiner*—Robert J. Hickey
*Attorney, Agent, or Firm*—Kenyon & Kenyon

[57] ABSTRACT

A method of charging a secondary electric battery from a primary source of electric current, the secondary battery being connected to supply an intermittent load that draws a current which is greater than the primary source is capable of supplying the method comprising recording the quantity of electricity discharged by the secondary cell, charging the secondary battery at a first rate from the beginning of its discharge, and continuing the charging at the said first rate for a period of time which is a function of the recorded discharge.

10 Claims, 2 Drawing Figures

METHOD AND DEVICE FOR CHARGING SECONDARY ELECTRIC BATTERIES BY PRIMARY SOURCES

The present invention relates to a method of charging secondary electric batteries from primary sources of electric current and to a device which applies this method.

Self-contained installations situated in isolated places which are not served by the public mains can be supplied by various sources of electric current which may be constituted either by primary electric cells or batteries, or else by secondary cells or batteries in association with primary sources such as solar cells, thermo-electric generators or turbo-electric generators supplied with butane or propane gas, or nuclear electric cells.

Primary electric batteries, for example, conventional saline or alkaline air-depolarized batteries remain at present inexpensive primary sources which can be used anywhere. These primary batteries can be economically associated with storage batteries when the load intermittently draws peaks of high current which are incompatible with the characteristics of the primary batteries alone. Such systems are described for example in U.S. Pat. No. 2,818,543. When the load circuits draw current repetitively, it is relatively easy to choose a suitable charging current, supplied permanently by the primary battery so as to keep them sufficiently charged, but not excessively charged which would increase the cost price of the system. The use of a constant current charging device also has the advantage of making the time interval for replacement of primary batteries reliably predictable which facilitates maintenance.

In constrast, if the current drawn is unpredictable and can lie between wide limits, it becomes impossible to choose a charging current which is sufficient and which is also economically feasible. By way of an example, the following case can be cited: a load circuit requires 10 amperes for 10 to 30 seconds. The interval between the current peaks of 10 A lies between 30 minutes and 12 hours. The necessary daily capacity then lies between about 5 Ah and less than 0.1 Ah; constant current charging is then not economical.

Further, it is known, among other patents, through French Pat. No. 2,055,916 and corresponding British Pat. No. 1,318,060 and South African Pat. No. 5,450/70 to recharge a storage battery at a rapid rate, the duration of this rapid charging rate being fixed by a meter which records the quantity of electricity taken from the storage battery during the preceding discharge. Advantageously, this meter is constituted by a small storage cell which is charged by the discharge of the storage battery and whose subsequent discharge determines the duration of the recharging of the battery at the rapid rate. Rapid rate recharging is continued until the battery has recovered the discharged ampere-hours. The charging rate is then reduced to a maintenance current or else the current can be turned off. These rapid charge rates or maintenance charging rates can be applied either at constant current or at constant voltage. The principle of the system is therefore to memorize the quantity of electricity supplied by the storage batteries and then to recharge this quantity, assigning an appropriate overcharge coefficient thereto. This quantity can be memorized by means of various methods using either up/down counting by means of logic circuits or by a purely analog method whose lower precision is, however, quite adequate for this application and is of incomparably lower cost.

However, in these known methods, the battery forms a part of an emergency device which replaces the mains in the case of failure and the recharging at the rapid rate of the storage battery is triggered by the return of the mains current. When the charging current source is capable of supplying current permanently, this being the case for example of a primary battery or of a nuclear cell, it is no longer possible to use this signal to engage the rapid recharging rate.

The present invention aims to remedy these drawbacks and to provide a charging method by which the battery can rapidly be made ready to supply a new discharge without thereby discharging unduly the primary current source.

It provides a method of charging a secondary electric battery from a primary source of electric current, the secondary battery being connected to supply an intermittent load that draws a current which is greater than the primary source is capable of supplying, the method comprising recording the quantity of electricity discharged by the secondary battery, charging the secondary battery at a first rate from the beginning of its discharge, and continuing the charging at the said first rate for a period of time which is a function of the recorded discharge.

In this way, it is possible to recharge the storage battery sufficiently rapidly for a time which is limited by the recharging needs. The signal for indicating the beginning of rapid charging can be the same as that which starts the memorizing of the discharge.

Charging at the first rate, which is a rapid rate, can be followed by charging at a second or maintenance rate. Or charging can be purely and simply interrupted after sufficient rapid rate charging.

The method is applicable whether charging is effected at constant current or at constant voltage.

The invention also provides a charging device applying the above method for use with a storage battery, the device including a charging circuit for said storage battery, first means for recording the electric current discharged from said storage battery and for actuating second means which control said charging circuit, and third means for detecting that the battery is discharging into its load and for actuating said second means to establish said first charge rate from the beginning of such detection.

The invention applies particularly well to devices where the primary source is an electric primary battery.

Embodiments of the invention are described by way of example with reference to the accompanying drawings, in which:

FIG. 1 shows particularly:

Figure 1:
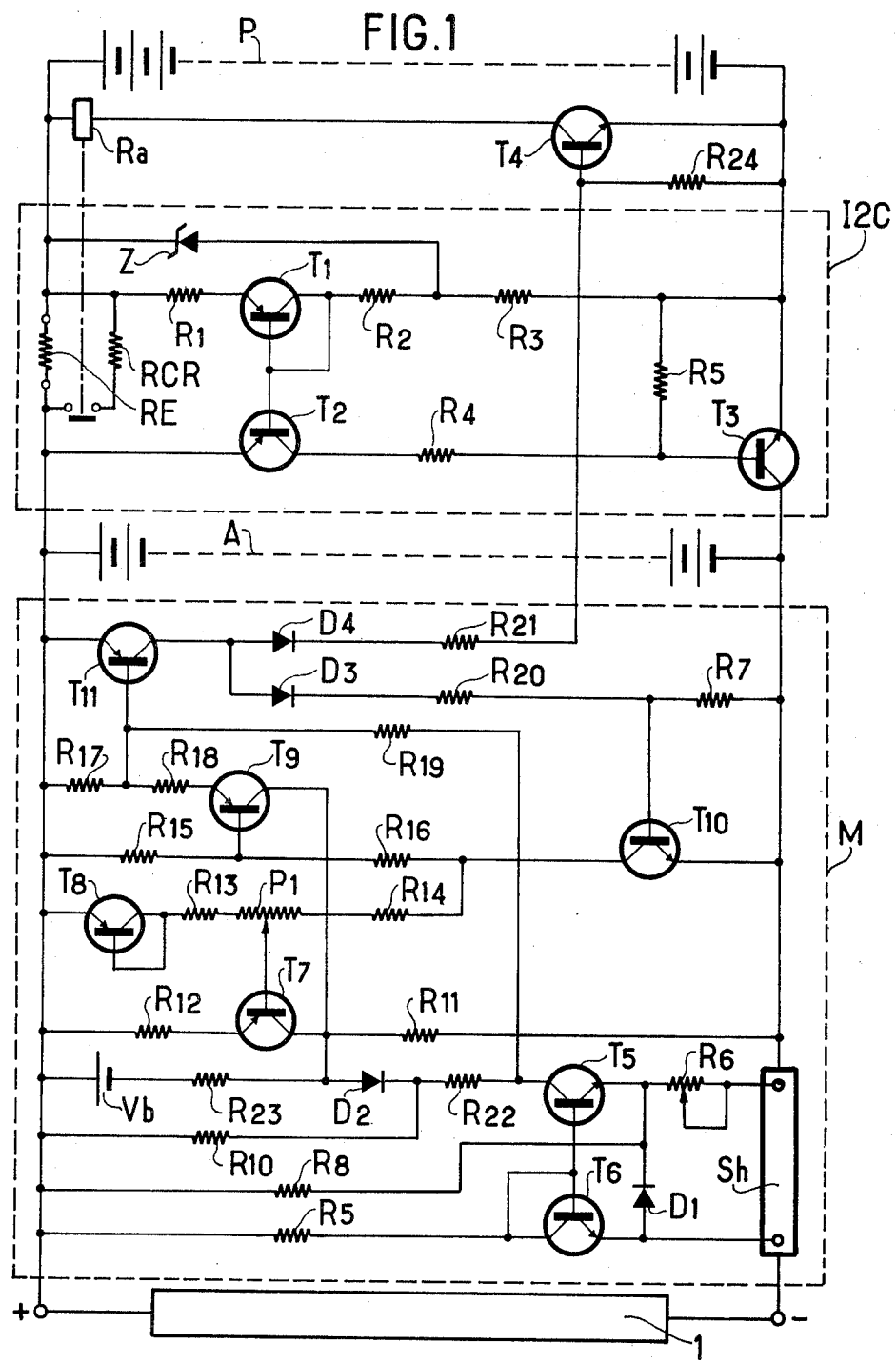
FIG. 1 is a circuit diagram of a charging device having two constant current rates in accordance with the invention.

a battery of primary cells P;

a charging circuit I2C having two constant current rates;

a storage battery A; and a memory circuit M, which records the discharge current and its duration for the storage battery A and which causes high rate charging during a time proportional to the quantity of electricity supplied by this battery.

The charging circuit I2C includes mainly:

a resistor RE, connected in series between the positive electrodes of the primary battery P and of the storage battery A, and used for limiting the charging current to a low rate; a resistor RCR can be connected in parallel across the terminals of the resistor RE by means of a relay Ra for charging at a high rate;

two PNP transistors T1 and T2 whose bases are electrically connected together; they constitute an amplifier for measuring the charging current of the battery A and they control an NPN type power transistor T3.

The emitter of the transistor T1 is connected by a resistor R1 to the positive electrode of the primary battery P; its collector is connected by resistors R2 and R3 in series to the negative electrode of the primary battery P. The base of the transistor T1 is connected to its collector. The emitter of the transistor T2 is connected to the positive electrode of the storage battery A; its collector is connected to the base of the transistor T3 by a resistor R4. The base of the transistor T3 is connected by a resistor R5 to its emitter which is itself connected to the negative terminal of the primary battery P. The collector of the transistor T3 is connected to the negative terminal of the storage battery A.

The charging circuit I2C also includes a Zener diode Z connected firstly to the positive electrode of the primary battery P and secondly to the point common to the two resistors R2 and R3. The circuit constituted by the resistor R1, the transistor T1 and the resistor R2 is therefore supplied at a constant voltage which corresponds to that of the Zener diode Z. The value of the resistor R1 is chosen in such a way that the voltage drop across its terminals, when the transistor T1 is conductive, is equal to the voltage drop across the terminals of the low rate resistor RE, for example about 0.4 volts.

The coil of the above-mentioned relay Ra is connected firstly to the positive electrode of the primary battery P and secondly to the collector of an NPN transistor T4 whose emitter is connected firstly to the negative electrode of the primary battery P and secondly to its base by a resistor R24.

As will be apparent further on in the specification, the transistor T4 controls the operation of the relay Ra which causes the resistor RCR to be put in parallel with the resistor RE: the resultant $$\frac{RE \cdot RCR}{RE + RCR}$$

defines the high rate charging current.

In outline the memory circuit M includes:

a low-value resistor Sh for measuring the discharge current of the storage battery A;

a memory storage cell Vb whose positive terminal is connected to the positive terminal of the storage battery A;

transistors T5 and T6 which control the charging of the storage cell Vb while the storage battery A is discharging; and transistors T7, T8, T9, T10 and T11 for discharging the storage cell Vb.

The various components of the circuit M will be described in greater detail hereinafter.

The resistor Sh connected to the negative terminal of the storage battery A is disposed in the discharge circuit of this battery in series with the load 1 connected between the + and − terminals of the memory circuit M.

The charging circuit of the storage cell Vb which includes an adjustable resistor R6 and the two NPN transistors T5 and T6 whose bases are electrically interconnected is disposed across the terminals of the resistor Sh. The collector of the transistor T5 is connected to the negative terminal of the storage cell Vb by means of a resistor R22, a diode D2 and a resistor R23 connected in series; its emitter is connected by the resistor R6 to the negative terminal of the primary battery P.

The collector of the transistor T6 is connected firstly to its base and secondly by a resistor R5 to the positive terminal of the storage battery A; its emitter is connected to the point common to the resistor Sh and the load.

A diode D1 is connected between the emitters of the transistors T5 and T6. A resistor R8 is connected between the positive pole of the storage battery A and the emitter of the transistor T5. A resistor R10 is connected between the positive pole of the storage battery A and the common point to the diode D2 and the resistor R22.

As has been said above, the discharge circuit of the storage cell Vb includes the PNP transistors T7, T8, T9 and T11 and the NPN transistor T10.

The transistor T7 has its emitter connected to the positive terminal of the storage cell Vb by a resistor R12 and its collector connected firstly to the negative terminal of the storage battery A by a resistor R11 and secondly to the negative terminal of the storage cell Vb by the resistor R23.

The transistor T8 has its emitter connected to the positive terminal of the storage cell Vb and its collector connected to its base and to the collector of the transistor T10 by a resistor R13, a potentiometer P1 and a resistor R14 in series. The base of the transistor T7 is connected to the mid point of the potentiometer P1.

The transistor T9 has its base connected firstly to the positive terminal of the storage cell Vb by a resistor R15 and secondly to the collector of the transistor T10 by a resistor R16; its emitter is connected to the positive terminal of the storage cell Vb by resistors R18 and R17 in series; its collector is connected to the collector of the transistor T7.

The transistor T11 has its emitter connected to the positive terminal of the storage battery A, its base connected firstly to the common point of the resistors R17 and R18 and secondly to the collector of the transistor T5 by a resistor R19; its collector is connected firstly to the base of the transistor T10 by a diode D3 and a resistor R20 in series and secondly to the base of the transistor T4 by a diode D4 and a resistor R21 in series.

The transistor T10 has its base connected to the negative terminal of the storage battery A by a resistor R7 and its emitter connected directly to this negative terminal.

The device operates as follows:

In the initial state, the fully charged storage battery A does not discharge into the load and the storage cell Vb is discharged.

As long as the load does not draw current from the batteries, the voltage drop at the terminals of the resistor Sh is zero. The transistor T5 is practically blocked more especially as it is subjected to a very low reverse bias coming from R8. The negligible current passed by the transistor T5 flows in the resistor R10 without charging the storage cell Vb. Since this storage cell is discharged, the transistors T8, T9, T10, T11 and T4 are blocked. The circuit consumes a minimum of energy.

The storage battery A is charged at a low rate by the primary battery P.

When the load draws a heavy current, the voltage drop at the terminals of the resistor Sh biases the transistor T5 and is transferred across the terminals of the resistor R6 which defines the charging current of the storage cell Vb. The transistor T5 is conductive and controls the biasing of the transistor T11 which is conductive and biases the transistors T4 and T10 which become conductive. Since T4 is conductive, a current flows in the coil of the relay Ra, and the contact of the relay closes, thus putting RCR in parallel with RE.

The storage battery A begins to be charged at the high rate. The transistor T10 biases the transistor T9 which maintains control of the transistor T11 as well as the transistor T7 which discharges the storage cell Vb at constant current.

When current is no longer drawn, the transistor T5 ceases to charge the storage cell Vb which has accumulated a charge proportional to that which has been drawn from the storage battery A.

The effective discharge of the storage cell Vb begins, and the transistors T7, T9, T10, T11 and T4 are kept conductive by the voltage of the storage cell Vb.

At the end of the discharge of the storage cell Vb, its voltage decreases. When it reaches about 0.8 V, the transistor T9 no longer conducts sufficiently for the transistor T11 to remain conductive, and it therefore blocks the transistors T10 and T4 and consequently the transistors T7 and T9. The relay Ra is de-energized causing the storage battery A to return to charging at the low rate.

The storage cell Vb, which is disconnected from the discharge circuit, then receives a low current in the charge direction; this current is limited to a few μA by the resistor R11. The storage cell Vb is then ready to record instantaneously the following discharge of the storage battery A.

According to the values of the components of the circuit and the adjustment of the resistor R6 and of the potentiometer P1, the duration for which the storage battery A is charged at the high rate lies between 4 and 40 times the duration of the heavy load current, and the overcharge coefficient of the battery lies between 1.3. and 1.6.

The capacity of the storage cell Vb is chosen to be sufficient to record, if required, a complete discharge of the storage battery A.

The transistors T1, T6 and T8 whose bases are connected to their collectors each define a temperature compensated voltage threshold.

Figure 2:
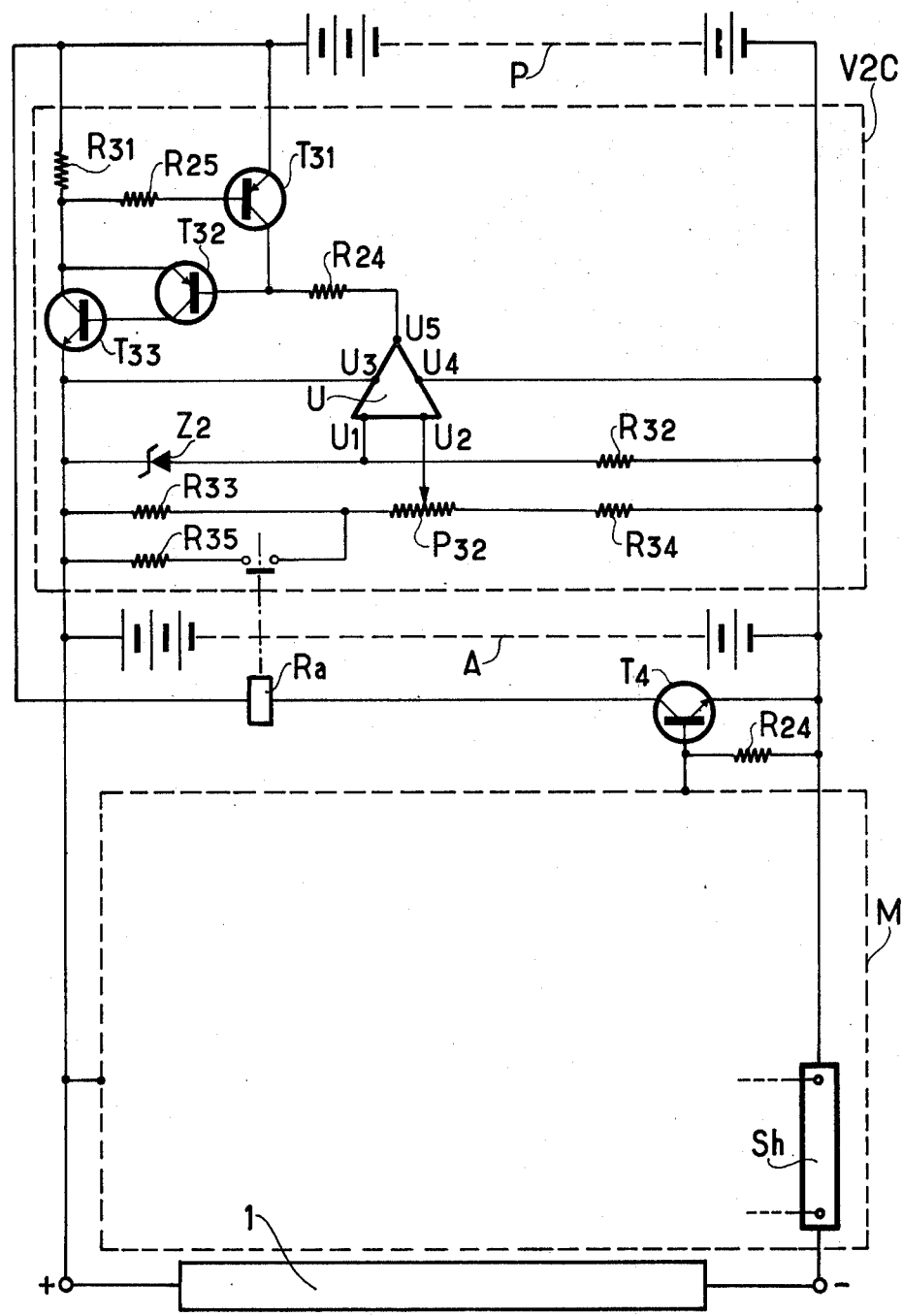
FIG. 2 is a circuit diagram of a charging device having two constant voltage rates in accordance with the invention.

FIG. 2 shows an analogous device but in which charging is at two voltage rates, with current limitation.

This device includes:
the previously mentioned primary battery P;
the preceding storage battery A whose negative terminal is connected to the negative terminal of the primary battery P;
a charging circuit V2C having two voltage rates;
the memory circuit M which is identical to that of FIG. 1; and
the relay Ra and its associated transistor T4 mentioned hereinabove.

The charging circuit VC2 includes essentially the following components:
a PNP transistor T31;
a PNP transistor T32 which controls an NPN power transistor T33;
a voltage regulating amplifier U; and
a Zener diode Z2.

The amplifier U has a first input terminal U1 connected firstly to the positive terminal of the storage battery A by the Zener diode Z2 and secondly to the negative terminal of the storage battery A by a resistor R32; a second input terminal U2 is connected to the mid point of a potentiometer P32 connected firstly to the positive terminal of the storage battery A by a resistor R33 and secondly to the negative terminal of the storage battery A by a resistor R34. The first input terminal U1 receives a reference voltage signal defined by the Zener diode Z2: the second input terminal U2 is brought to a potential which is a fraction of the voltage of the storage battery A determined by the voltage divider constituted by the resistor R33, the potentiometer P32 and the resistor R34.

A resistor R35 is connected in parallel with the resistor R33 by the contact of the relay Ra when this relay is supplied via the transistor T4, this changing the division ratio of said voltage divider.

The supply terminals U3 and U4 of the amplifier are connected respectively to the positive terminal and to the negative terminal of the storage battery A.

The output terminal U5 is connected via a resistor R24 firstly to the base of the transistor T32 and secondly to the collector of the transistor T31. The transistor T31 has its emitter connected to the positive terminal of the primary battery P and its base connected by a resistor R25 to the emitter of the transistor T32, which is itself connected by a resistor R31 to the positive terminal of the primary battery P.

The collector of the transistor T32 is connected to the base of the transistor T33 whose emitter is connected to the positive terminal of the storage battery A and whose collector is connected to the emitter of the transistor T32.

As in the case of FIG. 1, when the storage battery A discharges into the load, the circuit M controls the transistor T4, which causes the relay Ra to be energized and the resistor R35 to be connected in parallel with the resistor R33. This results in a difference in voltage between the terminals U1 and U2 of the amplifier U which controls the transistor T32 which itself controls the transistor T33. This results in a high charge rate at constant voltage. The transistor T31 limits the current discharged by the primary battery P through the resistor R31 which has a voltage across its terminals that biases the emitter-base junction of the transistor T31. When this current reaches and exceeds a predetermined limit value the transistor T31 biases the base of the transistor T32 so as to reduce the discharged current.

After complete discharge of the storage cell Vb (in the same conditions as in the example of FIG. 1) the resistor R35 is disconnected. A steady charging state at a low regulated voltage is obtained.

By way of example, the resistors R33, R34 and R35 and the potentiometer P32 are chosen so as to obtain a permanent floating battery voltage. In the case of a battery of alkaline storage cells A, the floating battery voltage is about 1.4 V per storage cell and the high charging rate voltage is about 1.5 volts. In the case of a battery of lead-acid storage cells A, these voltages are respectively about 2.2 and 2.4 volts.

The primary battery P is preferably an air-depolarized cell or a nuclear cell and has a voltage which is at least one volt greater than that of the storage battery A.

What is claimed is:

1. A method of charging a secondary electric battery from a primary source of electric current, the secondary battery being connected to supply an intermittently applied load that draws a current which is greater than the primary source is capable of supplying, the method comprising:
   sensing the current drawn by the load whenever the load is applied to the secondary electric battery;
   continuously recording a signal proportional to said sensed current drawn by the load during each period of application to obtain a value proportional to the total quantity of electricity discharged by the secondary battery during said period;
   charging the secondary battery from said primary source at a first rate from the beginning of its discharge upon application of the load; and
   continuing the charging at said first rate for a period of time which is a function of the recorded discharge value.

2. A method for charging according to claim 1, wherein charging at said first rate is followed by charging at a second rate which is lower than the first rate.

3. A method for charging according to claim 1, wherein charging is at constant current.

4. A method for charging according to claim 1, wherein charging is at constant voltage.

5. A battery charging device including a primary source and a charging circuit for charging a storage battery connected to an intermittently applied load which draws a greater current than the primary source is capable of supplying, wherein the improvement comprises:
   first means for accumulating a value corresponding to the amount of electricity discharged from a storage cell into an intermittently applied load;
   second means for actuating said charging circuit to charge the storage battery from said primary source at a first predetermined rate;
   third means responsive to a flow of current discharged by the storage battery into its load for delivering a signal proportional to said current flow to said first means and for actuating said second means upon commencement of said flow; and
   fourth means connected between said first and second means for depleting the accumulated value at a rate corresponding to said first charging rate and for maintaining the actuation of said second means until said accumulated value is reduced to zero.

6. A battery charging device according to claim 5 wherein said primary source comprises a primary electric battery.

7. A battery charging device according to claim 5 or 6 wherein said first means comprises:
   an electric storage cell and
   a charging circuit for said electric storage cell actuated by said third means.

8. A battery charging device according to claim 5 wherein said charging circuit comprises a first resistor and a second resistor, and said second means comprises a switch for connecting the first resistor in parallel with the second resistor.

9. A battery charging device according to claim 5 wherein said third means comprises:
   a third resistor of low resistance for connection between the storage battery and its load and
   a voltage detecting circuit connected across the terminals of said third resistor.

10. A battery charging device according to claim 5 wherein said fourth means comprises a circuit for discharging said electric storage cell at a constant rate.

* * * * *